(No Model.)
T. R. FERRALL.
ANTI-FRICTION BEARING.
No. 430,119. Patented June 17, 1890.
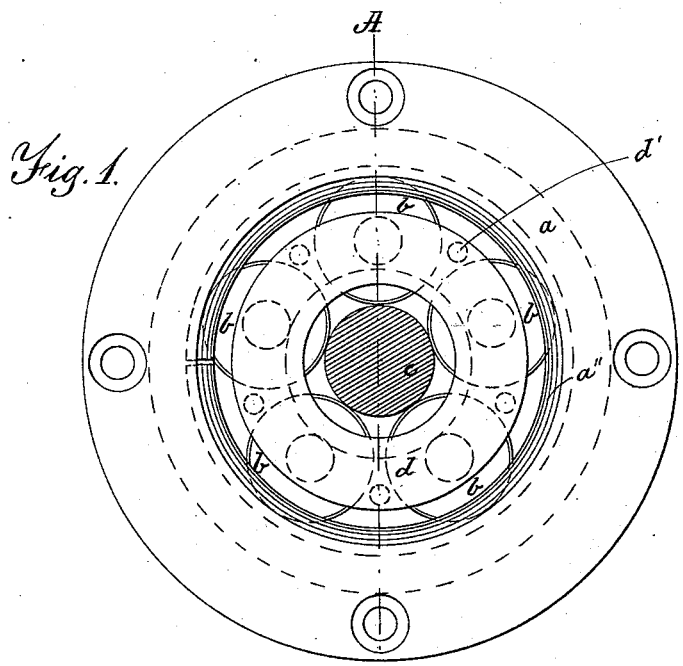
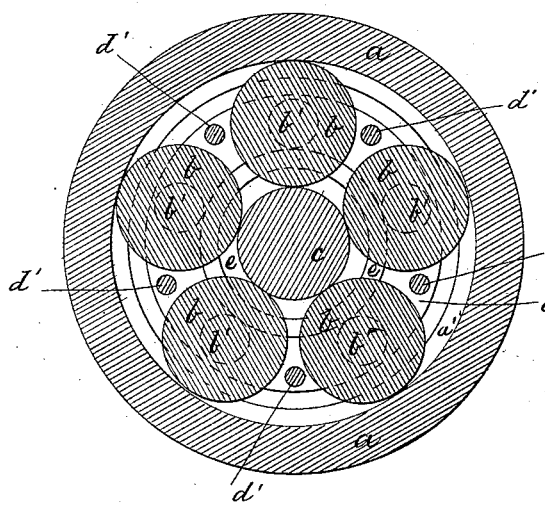
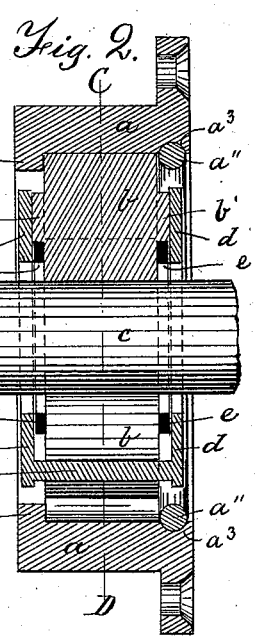
Witnesses:
Ernest Hazeltine
Henry Chadbourn
Inventor:
Thomas R. Ferrall
by Alban Andrén, his atty.

UNITED STATES PATENT OFFICE.

THOMAS R. FERRALL, OF BOSTON, MASSACHUSETTS, ASSIGNOR TO THE BOSTON & LOCKPORT BLOCK COMPANY, OF NEW JERSEY.

ANTI-FRICTION BEARING.

SPECIFICATION forming part of Letters Patent No. 430,119, dated June 17, 1890.

Application filed February 20, 1888. Renewed February 27, 1889. Serial No. 301,427. (No model.)

*To all whom it may concern:*

Be it known that I, THOMAS R. FERRALL, a citizen of the United States, and a resident of Boston, in the county of Suffolk and State of Massachusetts, have invented new and useful Improvements in Anti-Frictional Bearings, of which the following, taken in connection with the accompanying drawings, is a specification.

This invention relates to improvements in anti-frictional bearings for pulley-blocks and other purposes, and it is carried out as follows, reference being had to the accompanying drawings, wherein—

Figure 1 represents a front elevation of the improved bearing. Fig. 2 represents a central longitudinal section on the line A B, shown in Fig. 1; and Fig. 3 represents a cross-section on the line C D, shown in Fig. 2.

Similar letters refer to similar parts wherever they occur on the different parts of the drawings.

$a$ in the drawings is the cylindrical shell, as usual, having an annular inwardly-projecting lip $a'$ in one end to keep the anti-frictional rollers $b\ b\ b$ from moving in a longitudinal direction, and in its other end the split spring wire ring $a''$, resting in the annular groove $a^3$, for the same purpose, as is usual in bearings of this kind.

$b'\ b'$ are the central trunnions in the ends of the anti-friction rollers $b\ b$, as shown.

$c$ is the axle or spindle for which the bearing is intended, as shown in the drawings.

The regulator for holding the anti-friction rollers at proper distances apart is composed of the two annular rings $d\ d$, which are held at a proper distance apart by means of the stays or rivets $d'\ d'\ d'$, which latter may be made in one single piece with the rings $d\ d$, or riveted or otherwise secured to the latter, as may be desired. The stays $d'\ d'$, beside serving to hold the rings $d\ d$ at a proper distance apart about equal to the length of one of the rollers $b$ and its trunnions $b'$, also serve to prevent one roller in the series from coming in contact with its fellows, as shown in Fig. 3.

On the inside of each of the regulator-rings $d$ is arranged a loose ring $e$, of a thickness equal to about the longitudinal extension of the trunnions $b'\ b'$, as shown in Fig. 2, the exterior peripheries of which rings $e\ e$ serve as guides and bearings for the trunnions $b'\ b'$, and they also serve to keep the rollers $b\ b$ from moving toward the center of the shell $a$, when the spindle or shaft $c$ is removed from between said rollers. By having the said loose rings $e\ e$ arranged as above described a proper freedom of motion is given to the adjustment of the rollers $b\ b$, and consequently the latter will automatically adjust themselves to their proper working positions within the shell $a$ and relative to the spindle or shaft $c$.

What I wish to secure by Letters Patent, and claim, is—

1. In an anti-frictional bearing, the rollers $b\ b$, having cylindrical end trunnions $b'\ b'$, combined with the regulator composed of rings $d\ d$ and stays or dividers $d'\ d'$, and rings $e\ e$, arranged inside of the regulator-rings $d\ d$, as and for the purpose set forth.

2. In an anti-frictional bearing, the shell $a$, with its annular lip and ring $a'\ a''$, and rollers $b\ b$, with their trunnions $b'\ b'$, in combination with the regulator composed of rings $d\ d$ and stays or dividers $d'\ d'$, and the rings $e\ e$, arranged on the inside of the regulator-rings $d\ d$, as set forth.

3. In an anti-frictional bearing, the regulator-rings $d\ d$ and their stays or dividers $d'\ d'$, in combination with the rings $e\ e$, arranged on the inside of the said regulator-rings $d\ d$, as and for the purpose set forth.

In testimony whereof I have signed my name to this specification, in the presence of two subscribing witnesses, on this 8th day of February, A. D. 1888.

THOMAS R. FERRALL.

Witnesses:
 ALBAN ANDRÉN,
 ERNEST HESSELTINE.